(12) United States Patent
Orihara et al.

(10) Patent No.: US 12,515,444 B2
(45) Date of Patent: Jan. 6, 2026

(54) DECORATIVE SHEET AND DECORATIVE MEMBER

(71) Applicant: TOPPAN INC., Tokyo (JP)

(72) Inventors: Takashi Orihara, Tokyo (JP); Koichi Sagawa, Tokyo (JP)

(73) Assignee: TOPPAN INC., Tokyo (JP)

( * ) Notice: Subject to any disclaimer, the term of this patent is extended or adjusted under 35 U.S.C. 154(b) by 358 days.

(21) Appl. No.: 18/102,134

(22) Filed: Jan. 27, 2023

(65) Prior Publication Data

US 2023/0191760 A1 Jun. 22, 2023

Related U.S. Application Data

(63) Continuation of application No. PCT/JP2020/042091, filed on Nov. 11, 2020.

(30) Foreign Application Priority Data

Aug. 31, 2020 (JP) .................. 2020-146135

(51) Int. Cl.
| | | |
|---|---|---|
| *B32B 27/18* | (2006.01) | |
| *B32B 7/12* | (2006.01) | |
| *B32B 27/08* | (2006.01) | |
| *B32B 27/30* | (2006.01) | |
| *B32B 27/32* | (2006.01) | |
| *B32B 27/40* | (2006.01) | |

(52) U.S. Cl.
CPC .............. *B32B 27/18* (2013.01); *B32B 7/12* (2013.01); *B32B 27/08* (2013.01); *B32B 27/308* (2013.01); *B32B 27/32* (2013.01); *B32B 27/40* (2013.01); *B32B 2250/24* (2013.01); *B32B 2255/10* (2013.01); *B32B 2264/1051* (2020.08); *B32B 2264/303* (2020.08); *B32B 2307/732* (2013.01)

(58) Field of Classification Search
None
See application file for complete search history.

(56) References Cited

U.S. PATENT DOCUMENTS

| | | |
|---|---|---|
| 2019/0037850 A1 | 2/2019 | Hasegawa et al. |
| 2019/0255827 A1 | 8/2019 | Shibayama et al. |

FOREIGN PATENT DOCUMENTS

| | | | | |
|---|---|---|---|---|
| AU | 2012258633 A1 | * | 11/2013 | ............. A01N 59/16 |
| EP | 3 443 843 A1 | | 2/2019 | |
| JP | 2007-070299 A | | 3/2007 | |

(Continued)

OTHER PUBLICATIONS

Office Action issued in corresponding Japanese Patent Application No. 2020-146135, dated Mar. 2, 2021.

(Continued)

*Primary Examiner* — Tamra L. Dicus
(74) *Attorney, Agent, or Firm* — Foley & Lardner LLP

(57) ABSTRACT

A decorative sheet and a decorative member having high scratch resistance and antiviral properties. The decorative sheet includes a substrate sheet, an adhesive layer, a surface protective layer, and a thermoplastic resin layer, wherein at least one of the surface protective layer and the thermoplastic resin layer contains a nucleating agent or inorganic particles, and the surface protective layer has added thereto an antiviral agent at an amount of 0.2 parts by mass or more and 10 parts by mass or less.

7 Claims, 2 Drawing Sheets

(56) References Cited

FOREIGN PATENT DOCUMENTS

| JP | 2014-188941 A | | 10/2014 |
|---|---|---|---|
| JP | 2015080887 A | * | 4/2015 |
| JP | 2019-043089 A | | 3/2019 |
| KR | 10-2019-0084981 A | | 7/2019 |
| WO | WO-2017/179383 A1 | | 10/2017 |

OTHER PUBLICATIONS

Office Action issued in corresponding Japanese Patent Application No. 2020-146135, dated Nov. 10, 2020.
European Extended Search Report issued in corresponding European Patent Application No. 20951600.4 dated Jan. 22, 2024 (7 pages).
Office Action issued in corresponding Korean Patent Application No. 10-2022-7045642 dated Oct. 10, 2024.

* cited by examiner

DECORATIVE SHEET AND DECORATIVE MEMBER

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/042091, filed on Nov. 11, 2020, which in turn claims the benefit of JP 2020-146135, filed Aug. 31, 2020, the disclosures of all which are incorporated herein by reference in its entirety.

TECHNICAL FIELD

The present disclosure generally relates to decorative sheets and decorative members.

BACKGROUND

In the past, many decorative sheets using olefinic resin have been proposed as an alternative to polyvinyl chloride decorative sheets, but they have poor scratch resistance and are inferior to conventional polyvinyl chloride sheets (See, for example. PTL 1).

CITATION LIST

Patent Literature

PTL 1: JP 2014-188941A.

SUMMARY OF THE INVENTION

Technical Problem

In recent years, the demand for antiviral properties has increased, creating an urgent need for the development of antiviral products. However, when the decorative sheet is worn or scratched, the outermost surface of the decorative sheet is worn away, resulting in a decrease in antiviral properties. In particular, in the case of floor decorative sheets used as a flooring for use with outdoor footwear, such as shoes, heels, etc., there were problems such as the scratch resistance performance was inferior, the surface of the decorative floor sheets was easily scratched, and the abrasion of the outermost surface to which antiviral agents were added was noticeable.

The purpose of the present disclosure is to provide decorative sheets and decorative members with high scratch resistance and antiviral properties.

Solution to Problem

To solve the above problems, a decorative sheet according to one aspect of the present disclosure includes a substrate sheet; an adhesive layer; a surface protective layer; and a thermoplastic resin layer, wherein at least one of the surface protective layer and the thermoplastic resin layer contains a nucleating agent or inorganic particles, and the surface protective layer has added thereto an antiviral agent at an amount of 0.2 parts by mass or more and 10 parts by mass or less.

Advantageous Effects of the Invention

The decorative sheet according to one aspect of the present disclosure can provide a decorative sheet and a decorative member having high scratch resistance and antiviral properties.

DESCRIPTION OF THE EMBODIMENTS

Figure 1:
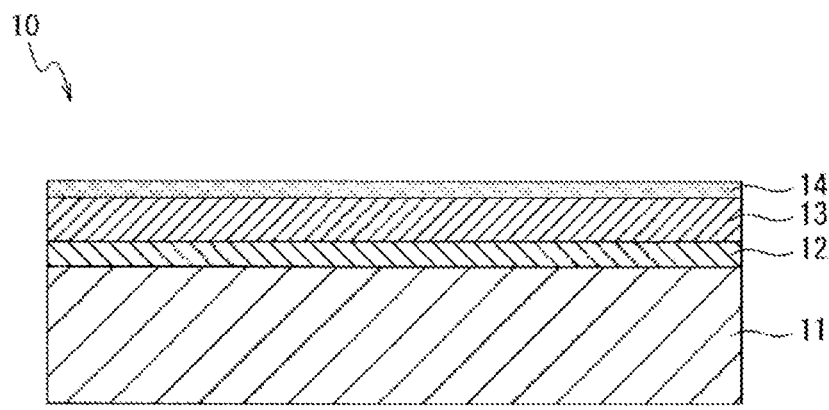
FIG. 1 is a schematic cross-sectional view illustrating an example of a configuration of a decorative sheet according to a first embodiment of the present invention.

An embodiment of the present disclosure will be described with reference to the drawings.

The configuration shown in the drawings are schematic, and the relationship between the thickness and the horizontal dimension, the thickness ratio between each layer, and the like differ from actual values. Furthermore, the embodiments described below show, as examples, configurations for embodying a technical idea of the present disclosure. The technical idea of the present disclosure is not limited to the materials, shapes, and structures of the components as below. The technical idea of the present disclosure can be variously modified within the technical scope defined in the claims.

First Embodiment (Configuration of Decorative Sheet)

The basic configuration of a decorative sheet according to the first embodiment of the present disclosure will be described with reference to FIG. 1. FIG. 1 is a cross-sectional view illustrating an example of a configuration of the decorative sheet 10 according to the first embodiment of the present disclosure.

As shown in FIG. 1, in the decorative sheet 10 according to one embodiment of the present invention, a colored pattern layer 12, an adhesive layer 13, and a surface protective layer 14 are laminated in this order on one surface of a substrate sheet 11. Each of the layers will now be described in detail.

(Substrate Sheet)

The substrate sheet 11 is a layer that serves as the substrate of the decorative sheet 10. In the present embodiment, a thermoplastic resin can be used as the substrate sheet 11. The thermoplastic resin is not particularly limited, and examples may include polyolefin resins such as polyethylene, polypropylene, polymethylpentene, polybutene, ethylene-propylene copolymer, ethylene-α-olefin copolymer, and propylene-α-olefin copolymer; polyolefin resins such as olefin-based copolymer resins such as ethylene-acetic acid vinyl copolymer, ethylene-vinyl alcohol copolymer, ethylene-(meth)acrylic acid (ester) copolymer, and a metal neutralized product (ionomer) of an ethylene-unsaturated carboxylic acid copolymer; polyester resins such as polyethylene terephthalate, polybutylene terephthalate, polytetramethylene terephthalate, polyethylene naphthalate, polyethylene terephthalate-isophthalate copolymer, 1,4-cyclohexanedimethanol copolymerized polyethylene terephthalate, polyarylate, and polycarbonate; acrylic resins such as poly(meth)acrylonitrile, polymethyl(meth)acrylate, polyethyl(meth)acrylate, polybutyl(meth)acrylate, and polyacrylamide; polyamide resins such as nylon-6, nylon-6,6, and nylon-6,10; styrene resins such as polystyrene, AS resin, and ABS resin; vinyl resins such as polyvinyl chloride, polyvinyl acetate, polyvinyl alcohol, polyvinyl acetal, and polyvinyl butyral; fluororesins such as polyvinyl fluoride, polyvinylidene fluoride, polytetrafluoroethylene, ethylene-tetrafluoroethylene copolymer, and ethylene-perfluoroalkylvinylether copolymer; and mixtures, copolymers, complexes, and laminates of two or more of these materials.

While many thermoplastic resins are mentioned above as the thermoplastic resin that can be used as the substrate sheet 11, from the perspective of the increasing social concerns over environmental problems in recent years, it is not preferable to use a thermoplastic resin containing chlorine (a halogen) such as a polyvinyl chloride resin, and it is preferred to use a halogen-free thermoplastic resin. In particular, from the perspective of physical properties, processability, versatility, cost-efficiency, and the like, a polyolefin resin or a polyester resin (amorphous or biaxially oriented) are most preferred to be used as the halogen-free thermoplastic resin.

The polyolefin resin may be selected from the many types listed above according to the intended use of the decorative sheet 10. Furthermore, the most suitable polyolefin resins for general use are polypropylene-based resins, that is, a homopolymer or a copolymer containing propylene as a principal component. For example, a homopolypropylene resin, random polypropylene resin, block polypropylene resin, and the like may be used alone or appropriately mixed, and a resin in which atactic polypropylene is appropriately additionally mixed with these resins may be used. The polyolefin resin may be a copolymer containing an olefin comonomer other than propylene, such as a propylene-α-olefin copolymer or the like having a crystalline polypropylene portion and containing α-olefin, other than propylene, with 2 to 20 carbons, preferably containing one or more comonomers from among ethylene, butene-1,4-methylpentene-1, hexene-1, and octene-1, at a ratio of 15 mol % or more. Also, a modifier which is typically used for softening polypropylene-based resins, such as low density polyethylene, ethylene-α-olefin copolymers, ethylene-propylene copolymer rubbers, ethylene-propylene-non-conjugated diene copolymer rubbers, styrene-butadiene copolymers, or a hydrogenated product thereof, can be added as appropriate.

In addition, one or more additives selected from a variety of additives such as, for example, colorants, fillers, ultraviolet absorbers, light stabilizers, heat stabilizers, antioxidants, antistatic agents, lubricants, flame retardants, antimicrobial agents, antifungal agents, antifriction agents, light scattering agents, and gloss conditioners may be added to the substrate sheet 11, as needed.

The substrate sheet 11 may preferably have a thickness in the range of 160 µm or more and 220 µm or less, and more preferably in the range of 180 µm or more and 190 µm or less. When the thickness of the substrate layer 11 is 160 µm or more, it is possible to absorb irregularities and steps in the floor material serving as the base, which improves the finish of the constructed decorative sheet 10. When the thickness of the substrate sheet 11 is 190 µm or less, it is not necessary to form the substrate sheet 11 thicker than necessary, and the production cost of the decorative sheet 10 can be reduced.

(Colored Pattern Layer)

The colored pattern layer 12 is formed on the substrate sheet 11 and serves as a layer for adding a pattern for imparting designability, and is provided as necessary. The colored pattern layer 12 can be omitted if it can be substituted by the coloring of the substrate sheet 11. The colored pattern layer 12 is formed using a printing ink or paint which is prepared by dissolving or dispersing a colorant such as a dye or pigment together with an appropriate binder resin in an appropriate dilution solvent. Printing inks or paints are applied by various printing methods, such as gravure printing or offset printing, or by various coating methods, such as gravure coating or roll coating. Furthermore, examples of binder resins that can be used may include, but of course not limited to, urethane-based resins, acrylic-based resins, vinyl chloride-acetate resins, polyimide-based resins, nitrocellulose, or a mixture of these. Any pattern may be used as the pattern, including, for example, a wood grain pattern, a stone grain pattern, a cloth pattern, an abstract pattern, a geometric pattern, characters, symbols, and monochromatic solid color, or a combination thereof. Moreover, in order to improve the concealment of the decorative sheet 10, an opaque printing ink or a coating material containing a large amount of an opaque pigment such as titanium dioxide or iron oxide may be provided as a concealing layer between the colored pattern layer 12 and the substrate sheet 11.

The colored pattern layer 12 may preferably have a thickness in the range of 3 µm or more and 20 µm or less. When the thickness of the colored pattern layer 12 is 3 µm or more, the printing can be made clear. When the thickness of the colored pattern layer 12 is 20 µm or less, the printing workability in producing the decorative sheet 10 is improved and the production cost can be reduced.

Further, in order to impart various functions to the colored pattern layer 12, for example, functional additives, such as an extender pigment, a plasticizer, a dispersant, a surfactant, a tackifier, an adhesive aid, a drying agent, a curing agent, a curing accelerator, and a curing retarder, may be added to the colored pattern layer 12.

The colored pattern layer 12 may further include, for example, a solidly coated colored layer to conceal the underlying color or pattern of an object to which the decorative sheet 10 is attached and a pattern layer to add a pattern to impart designability.

(Adhesive Layer)

The adhesive layer 13 is formed on the colored pattern layer 12 and is provided as needed to attach the substrate sheet 11 and the surface protective layer 14 together. The adhesive layer 13 can also be omitted if the adhesiveness of other layers is available. For the adhesive layer 13, there are no particular limitations on the type of adhesive used for the adhesive layer 13, but it is most desirable to use a two-component curable urethane adhesive that uses an isocyanate curing agent. Examples of the main agent of the two-component curable urethane adhesive that can be used include polyester polyols and polyether polyols. Examples of the curing agent that can be used include tolylene diisocyanate, diphenylmethane diisocyanate, xylylene diisocyanate, hexamethylene diisocyanate, and isophorone diisocyanate.

(Surface Protective Layer)

The surface protective layer 14 is a layer formed on the adhesive layer 13 and is provided to impart functions such as weather resistance, scratch resistance, stain resistance and designability to the decorative sheet 10.

For example, a mixture of an ionizing radiation-curable resin and an isocyanate-curable acrylic resin composition can be used as the material of the surface protective layer 14 in consideration of scratch resistance, weather resistance and durability. As for the scratch resistance, it is preferable that the surface protective layer 14 has a hardness of B or more in the pencil hardness test according to JIS K 5600. Furthermore, examples of ionizing radiation curable resins that can be used include a composition that mainly consists of at least one of a prepolymer, oligomer, and monomer having a polymerizable unsaturated bond such as a (meth)acryloyl group, which has the property of undergoing a crosslinking reaction upon irradiation with ionizing radiation. Examples of the ionizing radiation that can be used include an electron beam or ultraviolet rays. For example, additives such as polymerization initiators and sensitizers may be added to the ionizing radiation curable resin as needed.

Examples of the prepolymer or oligomer having a polymerizable unsaturated bond include a melamine (meth) acrylate, epoxy (meth) acrylate, urethane (meth) acrylate, polyester (meth) acrylate, polyether (meth)acrylate, and polyol (meth) acrylate. Examples of the monomers include monofunctional monomers such as methyl (meth)acrylate, ethyl (meth)acrylate, butyl (meth)acrylate, cyclohexyl (meth) acrylate, ethylhexyl (meth)acrylate, hydroxyethyl (meth) acrylate, and glycidyl (meth)acrylate, and bifunctional monomers such as ethylene glycol di(meth)acrylate, diethylene glycol di(meth)acrylate, polyethylene glycol diacrylate, propylene glycol diacrylate, butanediol diacrylate, and hexanediol diacrylate, and multifunctional monomers such as trimethylolpropane triacrylate, pentaerythritol tetraacrylate, and dipentaerythritol hexaacrylate.

Examples of the isocyanate-curable acrylic resin composition that can be used include a reaction product obtained by using an acrylic resin composition as the main agent, and a polyisocyanate compound as the curing agent. For example, an acrylic polyol compound may be adopted as the acrylic resin composition. As an acrylic polyol compound, for example, an acrylic polymer compound having a hydroxyl group in the side chain can be employed, which is obtained by copolymerizing a normal acrylic monomer such as methyl acrylate, ethyl acrylate, butyl acrylate, cyclohexyl acrylate, 2-ethylhexyl acrylate, methyl methacrylate, ethyl methacrylate, butyl methacrylate, cyclohexyl methacrylate, and 2-ethylhexyl methacrylate, with monomers containing hydroxyl groups such as such as 2-hydroxyethyl acrylate, 2-hydroxypropyl acrylate, 2-hydroxyethyl methacrylate, and 2-hydroxypropyl acrylate, and if necessary, copolymerizable monomers such as styrene, α-methylstyrene, vinyl toluene, divinylbenzene, vinyl acetate, vinyl butyrate, vinyl versatate, ethyl vinyl ether, acrylonitrile, and methacrylonitrile.

Examples of the isocyanate prepolymer of the polyisocyanate that can be used include tolylene diisocyanate (TDI), diphenylmethane diisocyanate (MDI), naphthalene diisocyanate (NDI), xylylene diisocyanate (XDI), hydrogenated diphenylmethane diisocyanate (hydrogenated MDI), hydrogenated xylylene diisocyanate (hydrogenated XDI), hexamethylene diisocyanate (HDI), and isophorone diisocyanate (IPDI). In particular, considering weather resistance, yellowing and productivity, a trimer of hexamethylene diisocyanate (HDI) can be used. In other words, an isocyanurate type made from HDI, i.e., HDI isocyanurate, a derivative of HDI, can be used. As the side chain of the isocyanate prepolymer, for example, a urethane bond can be used in consideration of the addition of flexibility to the surface protective layer 14.

The surface protective layer 14 may contain various additives such as ultraviolet absorbers, heat stabilizers, light stabilizers, anti-blocking agents, catalyst scavengers, colorants, light scattering agents, and gloss conditioners, as necessary.

The method of forming the surface protective layer 14 is not particularly limited, and the surface protective layer 14 is formed by applying a liquid coating of the above materials by a common method such as gravure coating, microgravure coating, comma coating, knife coating, or die coating, and then curing the liquid coating by a method suitable for the material, such as heat curing or ultraviolet curing.

A surfactant is added to the surface protective layer 14. The surfactant includes at least any one of a cationic surfactant, an amphoteric surfactant, and a nonionic surfactant. By adding the surfactant, the compatibility between the silver-based antiviral agent and the surface protective layer in the binder is improved, and a decorative sheet can be obtained in which concentration variations due to precipitation of the antiviral agent and the like during application are suppressed.

Moreover, the thickness of the surface protective layer 14 is preferably in the range of 3 µm or more and 15 µm or less. When the thickness of the surface protective layer 14 is 3 µm or more, the scratch resistance is improved. When the thickness of the surface protective layer 14 is 15 µm or less, the cost can be reduced without the need to use a larger amount of resin material than necessary.

[Antiviral Agent]

The surface protective layer 14 contains an antiviral agent which improves antiviral properties.

The antiviral agent is preferably made of a silver-based material. As the antiviral agents, inorganic antimicrobial agents such as antimicrobial zeolite, antimicrobial apatite, and antimicrobial zirconia, which are formed by incorporating metal ions such as silver ions, copper ions, or zinc ions into inorganic compounds such as zeolite, apatite, or zirconia, can be used. Additionally, as the antiviral agent, zinc pyrithione, 2-(4-thiazolyl)-benzimidazole, 10,10-oxybis phenoxarsine, organic nitrogen sulfur halogen-based agents, or pyridine-2-thiol-oxide, can be used, but silver antiviral agents are superior in terms of the antiviral effect.

The antiviral agent may also be made of a silver-based material supported on an inorganic material.

The amount of antiviral agent added to the surface protective layer 14 is preferably in the range of 0.2 parts by mass or more and 10 parts by mass or less. When the amount of antiviral agent added is 0.2 parts by mass or more, the antiviral agent works effectively and thus the antiviral properties are is improved. When the amount of the antiviral agent added is 10 parts by mass or less, the scratch resistance is improved.

The antiviral agent may preferably have an average particle size which is 0.5 times or more and 2 times or less the thickness of the surface protective layer 14. In other words, when the average particle diameter of the antiviral agent is φ and the thickness of the surface protective layer is D, the relationship $0.5 \le \varphi \le 2D$ is satisfied. When the average particle size of the antiviral agent is 0.5 times or more and 2 times or less the thickness of the surface protective layer 14, the antiviral properties are improved by increasing the contact area with the antiviral agent, and by expanding the surface area of the antiviral agent.

The antiviral agent may preferably have an average particle size of 1 µm or more and 10 µm or less. When the average particle size of the antiviral agent is 1 µm or more, the area of contact between the surface protective layer 14 and the antiviral agent is improved, thereby improving the antiviral properties. When the average particle size of the antiviral agent is 10 µm or less, the scratch resistance is improved.

It is preferable that there are a plurality of peaks in the particle sizes of antiviral agents. Specifically, the peaks of the particle sizes of the antiviral agents may preferably include a first peak which is in the range of 1 µm or more and 5 µm or less, and a second peak which is in the range of 5 µm or more and 10 µm or less. The second peak in the particle sizes of the antiviral agents is larger than the first peak. The presence of a plurality of peaks in the particle sizes of the antiviral agent improves the packing density of antiviral agent and allows more antiviral agent to be added.

This increases the area of contact with the antiviral agent and the surface area of the antivirus, thereby improving antiviral properties.

The surface protective layer 14 contains a nucleating agent that improves the crystallinity of the resin material. In the present embodiment, the nucleating agent is added to the resin material in a form of a nucleating agent vesicle that is covered by the outer membrane and formed into vesicles.

[Nucleating Agent]

The surface protective layer 14 contains a nano-sized nucleating agent. The nano-sized nucleating agent is preferably added to the polypropylene resin in the form of a nucleating agent vesicle, which is encapsulated in a vesicle having a monolayer outer membrane. In the present embodiment, the nucleating agent in the resin that constitutes the surface protective layer 14 may be encapsulated in the vesicle with a portion of the nucleating agent exposed. Since the surface protective layer 14 contains a nucleating agent, the crystallinity can be improved and the abrasion resistance (scratch resistance) of the decorative sheet 10 can be improved.

The nano-sized nucleating agent preferably has an average particle size of ½ or less of the wavelength region of visible light, and specifically, since the wavelength region of visible light is 400 nm or more and 750 nm or less, it is preferable that the average particle size is 375 nm or less.

Since nano-sized nucleating agents have extremely small particle sizes, the number of nucleating agents present per unit volume and the surface area increase in inverse proportion to the cube of the particle diameter. As a result, the distance between each nucleating agent particle becomes short, so that when crystal growth occurs from the surface of one nucleating agent particle added to the resin, the end where the crystal is growing comes into immediate contact with the end of the crystal growing from the surface of the other nucleating agent particle adjacent to the nucleating agent particle, and the end of each crystal inhibits the growth and stops the growth of each crystal. Therefore, the average particle size of spherulites in the crystal part of the crystalline resin can be reduced, for example, the spherulite size can be reduced to 1 μm or less. As a result, a resin film having high crystallinity and high hardness can be produced, and the stress concentration between spherulites that occurs during the bending process is efficiently dispersed, thus realizing a resin film having reduced cracking and whitening during bending.

When a nucleating agent is simply added, the particle size increases due to secondary aggregation of the nucleating agent in the resin. On the other hand, when a nucleating agent vesicle is added, the dispersibility in the resin is improved, so that the number of crystal nuclei with respect to the amount of the nucleating agent added increases significantly compared to the case where the nucleating agent is simply added. Therefore, the average particle size of spherulites in the crystal part of the resin is reduced, and the occurrence of cracking and whitening during bending can be suppressed. Therefore, the addition of a nucleating agent vesicle can further increase crystallinity, making it possible to achieve both higher elastic modulus and better processability.

The surface protective layer 14 is formed of a resin material to which a nucleating agent is added, for example, in the range of 0.05 to 0.5 parts by mass, more preferably 0.1 to 0.3 parts by mass, with respect to 100 parts by mass of polypropylene resin as the principal component. When a nucleating agent vesicle is used, the amount of the nucleating agent added to the resin material is the amount of the nucleating agent converted into the nucleating agent in the nucleating agent vesicle. When the amount of nucleating agent added is less than 0.05 parts by mass, the crystallinity of polypropylene may not be sufficiently improved and the scratch resistance of the surface protective layer 14 may not be sufficiently improved. When the amount of nucleating agent added exceeds 0.5 parts by mass, the spherulite growth of polypropylene is inhibited due to the excessive number of crystal nuclei, and as a result, the crystallinity of polypropylene does not improve sufficiently and the scratch resistance of the surface protective layer 14 may not improve sufficiently.

Here, the term "principal component" refers to a resin material that accounts for 50 mass % or more of the resin material which constitutes the surface protective layer 14.

In addition, as a method for nanonizing a nucleating agent, for example, a solid-phase method, in which nucleating agents are mainly mechanically pulverized to obtain nano-sized particles, a liquid-phase method, in which nano-sized particles are synthesized or crystallized in a solution containing dissolved nucleating agents or nucleating agents, and a gas-phase method, in which nano-sized particles are synthesized or crystallized from gas or vapor consisting of nucleating agents or nucleating agents, may be used as appropriate. Examples of solid-phase methods include ball mills, bead mills, rod mills, colloid mills, conical mills, disc mills, hammer mills, and jet mills. Examples of liquid-phase methods include crystallization, coprecipitation, sol-gel, liquid-phase reduction, and hydrothermal synthesis. Furthermore, examples of gas-phase methods include an electric furnace method, a chemical flame method, a laser method, and a thermal plasma method.

A supercritical reverse phase evaporation method is the preferred method for nanonizing nucleating agents. The supercritical reverse phase evaporation method is a method of producing a capsule (nano-sized vesicle) containing a target substance using carbon dioxide in a supercritical state, or under conditions of temperature or pressure above the critical point. Carbon dioxide in a supercritical state refers to carbon dioxide that is in a supercritical state with a temperature that is equal to or higher than the critical temperature (30.98° C.) and a pressure that is equal to or higher than the critical pressure (7.3773±0.0030 MPa). Carbon dioxide under a temperature condition that is equal to or exceeds the critical point or a pressure condition that is equal to or exceeds the critical point indicates carbon dioxide under conditions where only one of the temperature and the pressure exceeds the critical condition.

As a specific nanonization process by the supercritical reverse phase evaporation method, an emulsion of supercritical carbon dioxide and an aqueous phase is formed by first injecting an aqueous phase into a mixture fluid of supercritical carbon dioxide, phospholipid as an outer membrane forming substance, and nucleating agent as an encapsulated substance, and then stirring the mixture. Then, when the pressure is reduced, the carbon dioxide expands and evaporates to cause phase transition, and nanocapsules (nanovesicles) are formed in which the phospholipid in the form of a monolayer membrane covers the surface of the nucleating agent particles. The use of this supercritical reverse phase evaporation method can easily form a monolayer capsule, unlike the conventional encapsulation method in which the outer membrane is a multilayer film on the surface of the nucleating agent particles, and therefore smaller capsules can be prepared.

The nucleating agent vesicle can be prepared, for example, by the Bangham method, extrusion, hydration, detergent dialysis, reverse phase evaporation, freeze-thaw, supercritical reverse phase evaporation, and the like. The nucleating agent vesicle is preferably prepared by supercritical reverse phase evaporation, among others.

The outer membrane constituting the nucleating agent vesicle is made of, for example, a monolayer membrane.

Further, the outer membrane is made of, for example, a substance containing a biological lipid such as a phospholipid.

In the present description, a nucleating agent vesicle having an outer membrane made of biological lipid such as phospholipid is referred to as a radical scavenger liposome.

Examples of phospholipid that constitutes the outer membrane include glycerophospholipids such as phosphatidylcholine, phosphatidylethanolamine, phosphatidylserine, phosphatidic acid, phosphatidylglycerol, phosphatidylinositol, cardiopine, yolk lecithin, hydrogenated yolk lecithin, soybean lecithin, and hydrogenated soybean lecithin, and sphingophospholipids such as sphingomyelin, ceramide phosphorylethanolamine, and ceramide phosphorylglycerol.

Other substances that constitute the outer membrane of vesicles may be, for example, a dispersant such as a nonionic surfactant, or a mixture of the nonionic surfactant and cholesterols or triacylglycerol. Examples of the nonionic surfactant include one or more of the following: polyglycerol ether, dialkylglycerine, polyoxyethylene hydrogenated castor oil, polyoxyethylene alkyl ether, polyoxyethylene sorbitan fatty acid ester, sorbitan fatty acid ester, polyoxyethylene polyoxypropylene copolymer, polybutadiene-polyoxyethylene copolymer, polybutadiene-poly (2-vinylpyridine), polystyrene-polyacrylic acid copolymer, polyethylene oxide-polyethylethylene copolymer, and polyoxyethylene-polycaprolactam copolymer. Examples of the cholesterols include cholesterol, α-cholestanol, β-cholestanol, cholestane, desmosterol (5,24-cholestadiene-3β-ol), sodium cholate, and cholecalciferol.

The outer membrane of the liposomes may be made of a mixture of a phospholipid and a dispersant. In the decorative sheet 10 of the present embodiment, the nucleating agent vesicle is preferably a radical scavenger liposome having an outer membrane made of phospholipid. By constructing the outer membrane from phospholipids, the resin material, which is the principal component of the decorative sheet 10, can be made to have good compatibility with the vesicles.

The nucleating agent is not particularly limited as long as it is a substance to be a starting point for crystallization upon crystallization of the resin. Examples of the nucleating agent may include phosphoric acid ester metal salts, benzoic acid metal salts, pimelic acid metal salts, rosin metal salts, benzylidene sorbitol, quinacridone, sodium oleate, cyanine blue, and talc. In particular, it is preferable to use sodium oleate. In addition, to maximize the effect of nanoization, phosphoric ester metal salt, benzoic acid metal salt, pimelic acid metal salt, and rosin metal salt can be used because they are non-melting and good transparency is expected. When the material itself can be made transparent by nanoization, quinacridone, cyanine blue, talc, and the like, which are colored, may be used as well. The non-melting nucleating agent may be used by being appropriately mixed with melting benzylidene sorbitol.

Effects of First Embodiment

The decorative sheet 10 according to the present embodiment has the following advantageous effects.

(1) The decorative sheet 10 of the present embodiment contains an antiviral agent and a nucleating agent in the surface protective layer.

This configuration enables both higher antiviral properties and higher scratch resistance.

(2) In the decorative sheet 10 of the present embodiment, the surface protective layer 14 has added thereto an antiviral agent at an amount of 0.2 parts by mass or more and 10 parts by mass or less.

According to this configuration, the antiviral effect can be improved by containing 0.2 parts by mass or more of antiviral agent, and high scratch resistance can be obtained by setting the antiviral agent content to 10 mass parts or less.

Second Embodiment (Configuration of Decorative Sheet)

Figure 2:
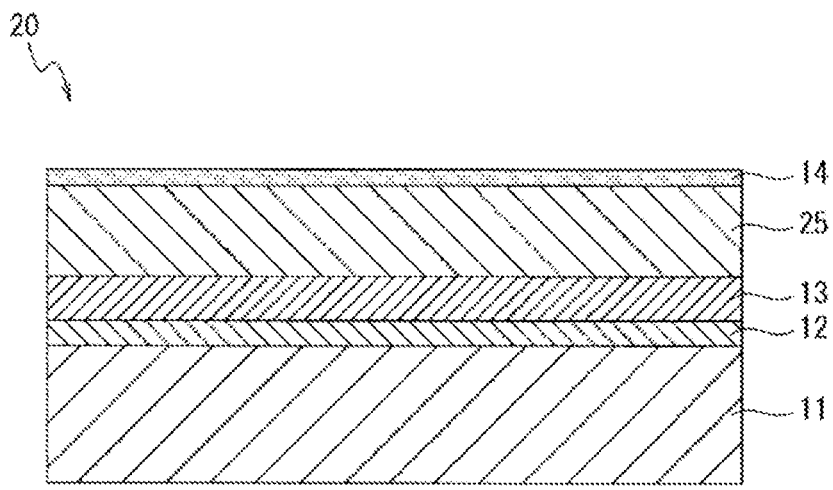
FIG. 2 is a schematic cross-sectional view illustrating an example of a configuration of a decorative sheet according to a second embodiment of the present invention.

A decorative sheet according to a second embodiment of the present disclosure will be described with reference to FIG. 2. FIG. 2 is a cross-sectional view illustrating an example of a configuration of a decorative sheet 20 according to the second embodiment of the present disclosure.

In the decorative sheet 20, a colored pattern layer 12, an adhesive layer 13, a thermoplastic resin layer 25, and a surface protective layer 14 are laminated in this order on one surface of a substrate sheet 11.

In detail, the decorative sheet 20 differs from the decorative sheet 10 according to the first embodiment in that the decorative sheet 10 includes a thermoplastic resin layer 25. The decorative sheet 20 differs from the decorative sheet 10 according to the first embodiment in that at least the surface protective layer 14 contains an antiviral agent, and at least one of the surface protective layer 14 and the thermoplastic resin layer 25 contains a nucleating agent.

The thermoplastic resin layer 25 will be described below. Since the layers (substrate sheet 11, colored pattern layer 12, adhesive layer 13, and surface protective layer 14) other than the thermoplastic resin layer 25 have the same structure as the layers of the decorative sheet 10, the description thereof is omitted.

(Thermoplastic Resin Layer)

As shown in FIG. 2, the thermoplastic resin layer 25 is a layer formed between the adhesive layer 13 and the surface protective layer 14.

The thermoplastic resin layer 25 may preferably have a thickness, for example, in the range of 50 μm or more and 110 μm or less, and more preferably, 70 μm or more and 95 μm or less. When the thickness of the thermoplastic resin layer 25 is 70 μm or more, the scratch resistance of the thermoplastic resin layer 25 against shoe heels or pebbles becomes sufficiently high. Furthermore, when the thickness of the thermoplastic resin layer 25 is 110 μm or less, the bending properties of the decorative sheet 10 do not become excessively high, and even when the floor member to which the decorative sheet 10 is attached is not flat, the decorative sheet 10 can be applied in close contact with the floor member.

[Resin Material]

As a resin material for forming the thermoplastic resin layer 25, for example, a thermoplastic resin can be used in the same manner as the substrate sheet 11. The thermoplastic resin is not particularly limited, and examples may include polyolefin resins such as polyethylene, polypropylene, polymethylpentene, polybutene, ethylene-propylene copolymer, ethylene-α-olefin copolymer, and propylene-α-olefin copolymer; polyolefin resins such as olefin-based copolymer resins such as ethylene-acetic acid vinyl copolymer, ethylene-vinyl alcohol copolymer, ethylene-(meth)acrylic acid (ester) copolymer, and a metal neutralized product (ionomer) of an ethylene-unsaturated carboxylic acid copolymer; polyester resins such as polyethylene terephthalate, polybutylene terephthalate, polytetramethylene terephthalate, polyethylene naphthalate, polyethylene terephthalate-isophthalate copolymer, 1,4-cyclohexanedimethanol copolymerized polyethylene terephthalate, polyarylate, and polycarbonate; acrylic resins such as poly(meth)acrylonitrile, polymethyl(meth)acrylate, polyethyl(meth)acrylate, polybutyl(meth)acrylate, and polyacrylamide; polyamide resins such as nylon-6, nylon-6,6, and nylon-6,10; styrene resins such as polystyrene, AS resin, and ABS resin; vinyl resins such as polyvinyl chloride, polyvinyl acetate, polyvinyl alcohol, polyvinyl acetal, and polyvinyl butyral; fluororesins such as polyvinyl fluoride, polyvinylidene fluoride, polytetrafluoroethylene, ethylene-tetrafluoroethylene copolymer, and ethylene-perfluoroalkylvinylether copolymer; and mixtures, copolymers, complexes, and laminates of two or more of these materials.

While many thermoplastic resins are mentioned above as the thermoplastic resin that can be used as the thermoplastic resin layer 25, from the perspective of the increasing social concerns over environmental problems in recent years, it is not preferable to use a thermoplastic resin containing chlorine (a halogen) such as a polyvinyl chloride resin, and it is preferred to use a halogen-free thermoplastic resin. In particular, from the perspective of physical properties, processability, versatility, cost-efficiency, and the like, a polyolefin resin or a polyester resin (amorphous or biaxially oriented) are most preferred to be used as the halogen-free thermoplastic resin.

The polyolefin resin may be selected from the many types listed above according to the intended use of the decorative sheet 10. Furthermore, the most suitable polyolefin resins for general use are polypropylene-based resins, that is, a homopolymer or a copolymer containing propylene as a principal component. For example, a homopolypropylene resin, random polypropylene resin, block polypropylene resin, and the like may be used alone or appropriately mixed, and a resin in which atactic polypropylene is appropriately additionally mixed with these resins may be used. The polyolefin resin may be a copolymer containing an olefin comonomer other than propylene, such as a propylene-α-olefin copolymer or the like having a crystalline polypropylene portion and containing α-olefin, other than propylene, with 2 to 20 carbons, preferably containing one or more comonomers from among ethylene, butene-1,4-methylpentene-1, hexene-1, and octene-1, at a ratio of 15 mol % or more. Also, a modifier which is typically used for softening polypropylene-based resins, such as low density polyethylene, ethylene-α-olefin copolymers, ethylene-propylene copolymer rubbers, ethylene-propylene-non-conjugated diene copolymer rubbers, styrene-butadiene copolymers, or a hydrogenated product thereof, can be added as appropriate.

In addition, one or more additives selected from a variety of additives such as, for example, colorants, fillers, ultraviolet absorbers, light stabilizers, heat stabilizers, antioxidants, antistatic agents, lubricants, flame retardants, antimicrobial agents, antifungal agents, antifriction agents, light scattering agents, and gloss conditioners may be added to the thermoplastic resin layer 25, as needed. The thermoplastic resin layer 25 may preferably have transparency (colorless and transparent, colored and transparent, or translucent) to the extent that the pattern of the pattern layer 2 can be seen via the surface (top surface) of the decorative sheet 10.

The thermoplastic resin layer 25 may contain an antiviral agent that improves antiviral properties, similar to the surface protective layer 14. The inclusion of an antiviral agent in the surface protective layer 14 enables the antiviral properties to be maintained on the outermost surface of the decorative sheet. The inclusion of antiviral agents in both the thermoplastic resin layer 25 and the surface protective layer 14 makes the surface protective layer 14 antiviral even if the thermoplastic resin layer 25 is exposed through abrasion. Thus, it is more preferable that both the surface protective layer 14 and the thermoplastic resin layer 25 contain an antiviral agent. Since the antiviral agent has the same structure as the antiviral agent contained in the surface protective layer 14 of the decorative sheet 10, the description thereof is omitted.

In the present embodiment, at least one of the surface protective layer 14 and the thermoplastic resin layer 25 contains a nucleating agent. The inclusion of a nucleating agent in the surface protective layer 14 provides excellent scratch resistance and abrasion resistance, and prevents scratches caused by shoe heel or pebbles during heavy foot traffic. The inclusion of a nucleating agent in the thermoplastic resin layer 25 enables the strength of the entire decorative sheet to be maintained even when the surface protective layer 14 wears away and the thermoplastic resin layer 25 is exposed from the surface of the decorative sheet. Additionally, the inclusion of a nucleating agent in both the surface protective layer 14 and the thermoplastic resin layer 25 improves scratch resistance, impact resistance, and caster resistance, which are necessary for flooring performance. Thus, it is more preferable that both the surface protective layer 14 and the thermoplastic resin layer 25 contain a nucleating agent. Since the nucleating agent has the same structure as the nucleating agent contained in the surface protective layer 14 of the decorative sheet 10, the description thereof is omitted.

Effects of Second Embodiment

The decorative sheet 20 according to the present embodiment has the following advantageous effects in addition to the advantageous effects of the first embodiment.

(3) The decorative sheet 20 of the present embodiment includes the thermoplastic resin layer 25.

This configuration improves the strength of the decorative sheet as a whole and provides cushioning properties.

Third Embodiment (Configuration of Decorative Sheet)

Figure 3:
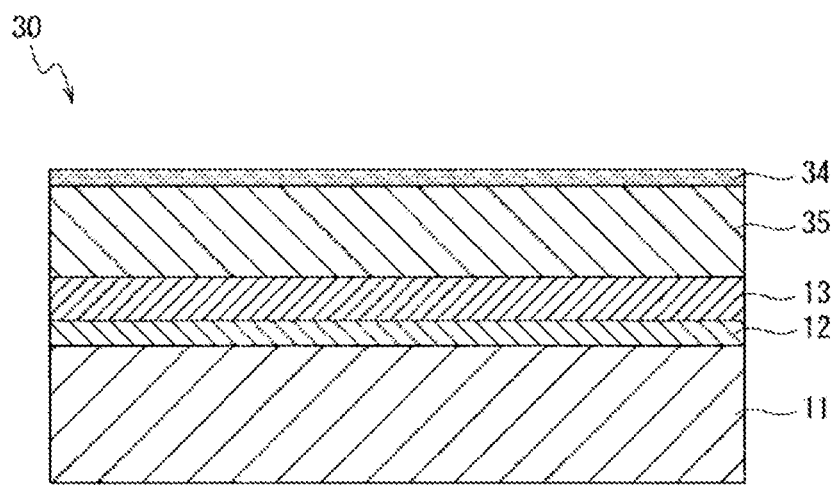
FIG. 3 is a schematic cross-sectional view illustrating an example of a configuration of a decorative sheet according to a third embodiment of the present invention.

A decorative sheet according to a third embodiment of the present disclosure will be described with reference to FIG. 3. FIG. 3 is a cross-sectional view illustrating an example of a configuration of the decorative sheet 30 according to the third embodiment of the present disclosure.

In the decorative sheet 30, a colored pattern layer 12, an adhesive layer 13, a thermoplastic resin layer 35, and a surface protective layer 34 are laminated in this order on one surface of a substrate sheet 11.

In detail, the decorative sheet 20 differs from the decorative sheet 10 according to the first embodiment in that the decorative sheet 10 includes the surface protective layer 34 instead of the surface protective layer 14, and also includes the thermoplastic resin layer 35. The decorative sheet 30 differs from the decorative sheet 10 in that the surface protective layer 34 or the thermoplastic resin layer 35 has nanoparticles instead of a nucleating agent.

The surface protective layer 34 and the thermoplastic resin layer 35 will be described below. Since the layers (substrate sheet 11, colored pattern layer 12, and adhesive layer 13) other than the surface protective layer 34 and the thermoplastic resin layer 35 have the same structure as the layers of the decorative sheet 10, the description thereof is omitted.

Examples of the inorganic particles include fine particles of inorganic materials, such as nano-sized silica, glass, alumina, titania, zirconia, calcium carbonate or barium sulfate.

The surface protective layer 34 is, for example, formed of a resin material to which inorganic particles are added in a range of 0.1 parts by mass or more and 30 parts by mass or less with respect to 100 parts by mass of the resin material. When the amount of inorganic particles added is 0.1 parts by mass or more, the effect of scratch resistance can be sufficiently obtained. When the amount of inorganic particles added is 30 parts by mass or less, deterioration of transparency can be prevented and the amount of materials can be reduced.

In the present embodiment, at least one of the surface protective layer 34 and the thermoplastic resin layer 35 contains inorganic particles. Thus, the strength of the decorative sheet 30 is improved.

Effects of Third Embodiment

The decorative sheet 30 according to the present embodiment provides the following advantageous effects similar to those of the first embodiment and the second embodiment.

Fourth Embodiment

Figure 4:
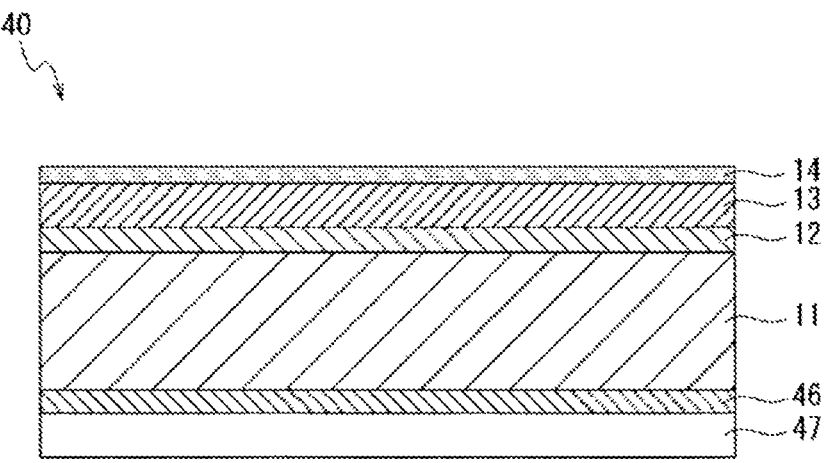
FIG. 4 is a schematic cross-sectional view illustrating an example of a configuration of a decorative sheet according to a fourth embodiment of the present invention.

A decorative sheet according to a fourth embodiment of the present disclosure will be described with reference to FIG. 4. FIG. 4 is a cross-sectional view illustrating an example of a configuration of a decorative sheet 40 according to the fourth embodiment of the present disclosure.
(Decorative Member)

The decorative 40 includes a colored pattern layer 12, an adhesive layer 13, and a surface protective layer 14, which are laminated in this order on one surface of a substrate sheet 11. On the other surface of the substrate sheet 11, a primer layer 46 and a substrate 47 are provided.

In detail, the decorative member 40 differs from the decorative sheet 10 according to the first embodiment in that the decorative member 40 includes the primer layer 46 and the substrate 47.

The primer layer 46 and the substrate 47 will be described below. Since the layers (substrate sheet 11, colored pattern layer 12, adhesive layer 13, and surface protective layer 14) other than the primer layer 46 and the substrate 47 have the same structure as the layers of the decorative sheet 10, the description thereof is omitted.
(Primer Layer)

The primer layer 46 is provided as needed to improve the adhesion to an adhesive used for adhesion to a substrate sheet 11 to be provided on the surface of the decorative sheet 10 on the side opposite to the colored pattern layer 12. For example, when the substrate is made of a wooden material, an adhesive such as vinyl acetate emulsion-based adhesive or a two-component curable urethane adhesive is used, and thus it is preferable to design the primer layer 46 using a resin which matches these adhesives. For example, urethane-based, acrylic-based, ethylene-vinyl acetate copolymer, vinyl chloride-vinyl acetate copolymer-based, polyester-based, and the like can be used. In particular, a two-component curable urethane primer compound formulated with polyester polyol and polyisocyanate is preferable. Furthermore, for example, the addition of an inorganic powder such as silica, barium sulfate, or calcium carbonate is effective for preventing blocking during roll storage and for improving the adhesion due to an anchoring effect.
(Substrate)

As the substrate 47, a wooden substrate or a metallic substrate can be used. Examples of the wood substrate that can be used include wood veneer, wood plywood, laminated lumber, particle board, medium-density fiberboard, and hard fiberboard. As a result of forming the substrate 47, it is possible to provide a decorative sheet 40 that is capable of suppressing the occurrence of scratches caused by shoe heels or small stones during heavy foot traffic.

Although the primer layer 46 and the substrate 47 are adhered to the decorative sheet 10 in the present embodiment, the decorative sheet 20 or the decorative sheet 30 may be used instead of the decorative sheet 10 to form the decorative member.

Effects of Fourth Embodiment

The decorative member 40 according to the present embodiment has the following advantageous effects in addition to the advantageous effects of the first embodiment to the third embodiment (4) The decorative member 40 of the present embodiment includes the primer layer 46 and the substrate 47.

With this configuration, it is possible to suppress the occurrence of scratches caused by shoe heels or pebbles during heavy foot traffic.

EXAMPLES

Hereinafter, the present disclosure will be described in more detail with reference to examples, but the present disclosure is in not in any way limited by these examples.

Example 1

First, a sheet of colored polyethylene resin (PE) was prepared as a substrate. The thickness of the substrate was 55 μm. Then, the one surface (front surface) of the substrate was subjected to corona discharge treatment. Then, a pattern layer was formed by applying a urethane-based printing ink on the surface of the substrate subjected to corona discharge treatment. Subsequently, a urethane-based adhesive was applied to the surface of the pattern layer to form an adhesive layer.

Next, a thermoplastic resin layer was formed by placing a polypropylene (PP) film on the surface of the adhesive layer. The thickness of the thermoplastic resin layer was 100 μm. Below is a description of the detailed preparation method of the resin composition of the thermoplastic resin layer with the nucleating agent vesiculated by the supercritical reverse phase evaporation method. First, in a method of forming vesicles of the nucleating agent using supercritical reverse phase evaporation, 100 parts by weight of methanol, 82 parts by weight of a phosphoric ester metal salt-based nucleating agent (ADK STAB NA-11, manufactured by ADEKA Corporation) as a nucleating agent, and 5 parts by weight of phosphatidyl choline as a substance configuring an outer membrane of the vesicle were placed in a high-pressure stainless steel container kept at 60° C. and tightly sealed. Carbon dioxide was then injected to a pressure of 20 MPa to be produce a supercritical state, followed by vigorous stirring and mixing while injecting 100 parts by weight of ion exchanged water. After stirring for 15 minutes while keeping the temperature and the pressure in the container in a supercritical state, carbon dioxide was discharged to return to atmospheric pressure, thereby obtaining a vesiculated nucleating agent. For formation of a transparent resin sheet as the thermoplastic resin layer in practice, 500 PPM of a hindered phenol-based antioxidant (Irganox 1010: manufactured by BASF SE), 2000 PPM of a benzotriazole-based ultraviolet absorber (Tinuvin 328: manufactured by BASF SE), 2000 PPM of a hindered amine-based light stabilizer (Chimassorb 944: manufactured by BASF SE), and 1000 PPM of a nucleating agent nanonized by the supercritical reverse phase evaporation method were added to a highly crystalline homopolypropylene resin having a pentad fraction of 97.8%, a MFR (melt flow rate) of 15 g/10 min. (230° C.), and a molecular weight distribution MWD (Mw/Mn) of 2.3, followed by extruding the resin using a melt extruder for film formation of a resin sheet made of a highly crystalline polypropylene resin with a thickness of 100 μm used as a thermoplastic resin layer.

Subsequently, a mixture of an ionizing radiation-curable resin and an isocyanate-curable acrylic resin composition consisting mainly of acrylic polyol as a main agent and polyisocyanate as a curing agent was applied to the surface of the thermoplastic resin layer and cured to form a surface protective layer. At this time, the ratio of the isocyanate-curable acrylic resin composition to the total mass of the surface protective layer was 30 parts by mass. The amount of polyisocyanate added was 10 parts by mass (NCO/

OH=1.0) to the acrylic resin composition. As an antiviral agent, 0.2 parts by mass of a silver-based inorganic additive (BIOSAIDO TB-B100, manufactured by Taisho Technos Co., Ltd.) with an average particle size of 5 µm was added to the acrylic resin composition. The active ingredients of the antiviral agent are supported by an inorganic material. The first peak in the particle sizes of the antiviral agents was 3 µm, and the second peak in the particle sizes of the antiviral agents was 7 µm.

To the acrylic resin composition, 0.01 parts by mass of a nucleating agent vesicle containing a nano-sized nucleating agent encapsulated in a vesicle having a monolayer outer membrane was added for the total mass of the acrylic resin composition. The vesicle formation by supercritical reverse phase evaporation method will be described. First, 100 parts by weight of methanol, 70 parts by weight of sodium oleate as a dispersant, and 5 parts by weight of phosphatidylcholine as a material constituting the outer membrane of the vesicle were placed in a high-pressure stainless steel container kept at 60° C. and tightly sealed, and then carbon dioxide was injected into the container so that pressure becomes 20 MPa and bring it to a supercritical state. The container is then agitated vigorously and 100 parts by weight of ion-exchanged water is injected into the container. After stirring and mixing for an additional 15 minutes while keeping the temperature and pressure in a supercritical state, carbon dioxide is discharged from the container and returned to atmospheric pressure to obtain liposomes having an outer membrane made of phospholipids containing dispersants. When a substance such as a dispersant is used for the outer membrane of the vesicle, it can be obtained by using the dispersant described above instead of phosphatidylcholine.

The surface protective layer had a thickness of 10 µm. The antiviral agent had an average particle size which is 0.5 times the thickness of the surface protective layer.

The decorative sheet of Example 1 was thus produced. The decorative sheet had a thickness of 140 µm.

Example 2

The amount of antiviral agent added was changed to 5 parts by mass. Except for the above, a decorative sheet of Example 2 was made in the same manner as in Example 1.

Example 3

The amount of antiviral agent added was changed to 10 parts by mass. Except for the above, a decorative sheet of Example 3 was made in the same manner as in Example 1.

Example 4

The average particle size of antiviral agent was changed to 0.1 µm. Except for the above, a decorative sheet of Example 4 was made in the same manner as in Example 2.

Example 5

The average particle size of antiviral agent was changed to 1 µm. Except for the above, a decorative sheet of Example 5 was made in the same manner as in Example 2.

Example 6

The average particle size of antiviral agent was changed to 10 µm. Except for the above, a decorative sheet of Example 6 was made in the same manner as in Example 2.

Example 7

The average particle size of antiviral agent was changed to 20 µm. Except for the above, a decorative sheet of Example 7 was made in the same manner as in Example 2.

Example 8

The first peak in the particle sizes of the antiviral agents was changed to 0.1 µm. Except for the above, a decorative sheet of Example 8 was made in the same manner as in Example 2.

Example 9

The first peak in the particle sizes of the antiviral agents was changed to 1 µm. Except for the above, a decorative sheet of Example 9 was made in the same manner as in Example 2.

Example 10

The first peak in the particle sizes of the antiviral agents was changed to 5 µm. Except for the above, a decorative sheet of Example 10 was made in the same manner as in Example 2.

Example 11

The first peak in the particle sizes of the antiviral agents was changed to 6 µm. Except for the above, a decorative sheet of Example 11 was made in the same manner as in Example 2.

Example 12

The second peak in the particle sizes of the antiviral agents was changed to 4 µm. Except for the above, a decorative sheet of Example 12 was made in the same manner as in Example 2.

Example 13

The second peak in the particle sizes of the antiviral agents was changed to 5 µm. Except for the above, a decorative sheet of Example 13 was made in the same manner as in Example 2.

Example 14

The second peak in the particle sizes of the antiviral agents was changed to 10 µm. Except for the above, a decorative sheet of Example 14 was made in the same manner as in Example 2.

Example 15

The second peak in the particle sizes of the antiviral agents was changed to 20 µm. Except for the above, a decorative sheet of Example 15 was made in the same manner as in Example 2.

Example 16

The first peak in the particle sizes of the antiviral agents was changed to 0.1 µm, and the second peak in the particle sizes of the antiviral agents was changed to 4 µm. Except for the above, a decorative sheet of Example 16 was made in the same manner as in Example 2.

Example 17

The first peak in the particle sizes of the antiviral agents was changed to 10 µm, and the second peak in the particle sizes of the antiviral agents was changed to 20 µm. Except for the above, a decorative sheet of Example 17 was made in the same manner as in Example 2.

Example 18

The thickness of the surface protective layer was changed to 1 µm. Except for the above, a decorative sheet of Example 18 was made in the same manner as in Example 2.

Example 19

The thickness of the surface protective layer was changed to 3 µm. Except for the above, a decorative sheet of Example 19 was made in the same manner as in Example 2.

Example 20

The thickness of the surface protective layer was changed to 15 µm. Except for the above, a decorative sheet of Example 20 was made in the same manner as in Example 2.

Example 21

The thickness of the surface protective layer was changed to 25 µm. Except for the above, a decorative sheet of Example 21 was made in the same manner as in Example 2.

Example 22

In the surface protective layer, an untreated nucleating agent was used instead of a nucleating agent vesicle in which a nano-sized nucleating agent was encapsulated in a vesicle having a monolayer outer membrane. Except for the above, a decorative sheet of Example 22 was made in the same manner as in Example 2.

Example 23

In the surface protective layer, 0.01 parts by mass of inorganic particles were added instead of nucleating agent vesicles. Except for the above, a decorative sheet of Example 23 was made in the same manner as in Example 2.

Example 24

The process of adding nucleating agent was omitted in the formation of a surface protective layer. Furthermore, in the thermoplastic resin layer, 0.01 parts by mass of a nucleating agent vesicles, in which a nano-sized nucleating agent was encapsulated in a vesicle having a monolayer outer membrane, was added to the total mass of the thermoplastic resin layer. Except for the above, a decorative sheet of Example 24 was made in the same manner as in Example 2.

Example 25

In the thermoplastic resin layer, an untreated nucleating agent was used instead of a nucleating agent vesicle in which a nano-sized nucleating agent was encapsulated in a vesicle having a monolayer outer membrane. Except for the above, a decorative sheet of Example 25 was made in the same manner as in Example 24.

Example 26

In the thermoplastic resin layer, 0.01 parts by mass of inorganic particles were added instead of nucleating agent vesicles. Except for the above, a decorative sheet of Example 26 was made in the same manner as in Example 24.

Example 27

In the thermoplastic resin layer, 0.01 parts by mass of a nucleating agent vesicles, in which a nano-sized nucleating agent was encapsulated in a vesicle having a monolayer outer membrane, was added to the total mass of the thermoplastic resin layer. Except for the above, a decorative sheet of Example 27 was made in the same manner as in Example 2.

Comparative Example 1

The process of adding an antiviral agent was omitted in the formation of a surface protective layer. Except for the above, a decorative sheet of Comparative Example 1 was made in the same manner as in Example 28.

Comparative Example 2

The amount of antiviral agent added was changed to 0.1 parts by mass. Except for the above, a decorative sheet of Comparative Example 2 was made in the same manner as in Comparative Example 1.

Comparative Example 3

The process of adding nucleating agent was omitted in the formation of a surface protective layer. Except for the above, a decorative sheet of Comparative Example 3 was made in the same manner as in Comparative Example 2.

Comparative Example 4

The amount of antiviral agent added was changed to 11 parts by mass. Except for the above, a decorative sheet of Comparative Example 4 was made in the same manner as in Comparative Example 1.

<Evaluation Assessment>

The antiviral properties and scratch resistance of the decorative sheets obtained in Examples 1 to 27 and Comparative Examples 1 to 4 were evaluated by the following methods.

<Evaluation>

[Antiviral Properties]

The decorative sheets of Examples 1 to 27 and Comparative Examples 1 to 4 were subjected to antiviral testing according to ISO 21702. The specimen was placed in a sterile petri dish and 0.4 mL of viral solution was inoculated onto the specimen. At this time, a virus solution containing an enveloped virus (influenza virus) was used as the virus solution. A 40 mm square polyethylene film was then placed on the specimen. After the petri dish was covered, the specimen and virus were inoculated under conditions of 25° C. and humidity of 90% or more. After a predetermined time, 10 mL of SCDLP medium was poured into the petri dish to wash out the virus. A viral infectivity titer of the washout solution were measured by the plaque method.

<Measurement of Viral Infectivity Titer (Plaque Method)>

Host cells were cultured in a monolayer on a 6-well plates, and the wells were inoculated with 0.1 mL of serially diluted washout solution. The cells were incubated for 1 hour under conditions of 5% $CO_2$ and 37° C. to adsorb the virus, and then agar medium was poured into a 6-well plate and incubated for another 2 to 3 days. After incubation, the cells were fixed and stained, and the number of plaques formed was counted.

<Calculation of Viral Infectivity Titers>

The virus infectivity titer per cm2 of specimen was calculated according to the following formula.

$$V = (10 \times C \times D \times N)/A$$

V: Virus infectivity titers per cm2 of specimen (PFU/cm2)
C: Number of plaques measured
D: Dilution factor of well in which the plaques were measured
N: Amount of SCDLP
A: Area of contact between specimen and virus (area of polyethylene film)

<Calculation of Antiviral Activity Values>

Antiviral activity values were calculated according to the following formula.

Antiviral activity value = log (Vb) − log (Vc)

Log (Vb): Common logarithm of virus infectivity titer per cm2 of unprocessed specimen after 24 hours
Log (Vc): Common logarithm of virus infectivity titer per cm2 of antiviral processed specimen after 24 hours The calculated antiviral activity values were evaluated in the following three grades of excellent, good, and poor.

(Evaluation Criteria)
Excellent: Antiviral activity value of 3 log 10 or higher
Good: Antiviral activity value of 2 log 10 or higher
Poor: Antiviral activity value of less than 2 log 10

[Scratch Resistance]

The decorative sheets of Examples 1 to 27 and Comparative Examples 1 to 4 were subjected to a pencil hardness test as specified in JIS K 5600 to confirm the degree of scratching, and evaluated in the following three grades of excellent, good, and poor.

(Evaluation Criteria)
Excellent: No scratches with B or better
Good: No scratches with 2B to 3B
Poor: Scratches observed with 4B or worse The above evaluation results are shown in Table 1.

TABLE 1

| | Antiviral agent | | | | Surface protective layer | | | | Thermoplastic resin layer | | | Evaluation | |
|---|---|---|---|---|---|---|---|---|---|---|---|---|---|
| | Addition amount (pts · mass) | Average particle size (μm) | First peak in particle sizes (μm) | Second peak in particle sizes (μm) | Thickness (μm) | Average particle size of antiviral agents with respect to thickness D of surface protective layer | Nucleating agent | Condition of nucleating agent | Inorganic particles | Nucleating agent | Condition of nucleating agent | Inorganic particles | Antiviral properties | Scratch resistance |
| Ex. 1 | 0.2 | 5 | 3 | 7 | 10 | 0.5 D | Present | Vesicle | Not Present | — | Not Present | Not Present | Excellent | Excellent |
| Ex. 2 | 5 | 5 | 3 | 7 | 10 | 0.5 D | Present | Vesicle | Not Present | — | Not Present | Not Present | Good | Excellent |
| Ex. 3 | 10 | 5 | 3 | 7 | 10 | 0.5 D | Present | Vesicle | Not Present | — | Not Present | Not Present | Excellent | Excellent |
| Ex. 4 | 5 | 0.1 | 3 | 7 | 10 | 0.01 D | Present | Vesicle | Not Present | — | Not Present | Not Present | Good | Excellent |
| Ex. 5 | 5 | 1 | 3 | 7 | 10 | 0.1 D | Present | Vesicle | Not Present | — | Not Present | Not Present | Excellent | Excellent |
| Ex. 6 | 5 | 10 | 3 | 7 | 10 | 1 D | Present | Vesicle | Not Present | — | Not Present | Not Present | Excellent | Excellent |
| Ex. 7 | 5 | 20 | 3 | 7 | 10 | 2 D | Present | Vesicle | Not Present | — | Not Present | Not Present | Excellent | Good |
| Ex. 8 | 5 | 5 | 0.1 | 7 | 10 | 0.5 D | Present | Vesicle | Not Present | — | Not Present | Not Present | Excellent | Good |
| Ex. 9 | 5 | 5 | 1 | 7 | 10 | 0.5 D | Present | Vesicle | Not Present | — | Not Present | Not Present | Good | Excellent |
| Ex. 10 | 5 | 5 | 5 | 7 | 10 | 0.5 D | Present | Vesicle | Not Present | — | Not Present | Not Present | Excellent | Excellent |
| Ex. 11 | 5 | 5 | 6 | 7 | 10 | 0.5 D | Present | Vesicle | Not Present | — | Not Present | Not Present | Excellent | Good |
| Ex. 12 | 5 | 5 | 3 | 4 | 10 | 0.5 D | Present | Vesicle | Not Present | — | Not Present | Not Present | Excellent | Good |
| Ex. 13 | 5 | 5 | 3 | 5 | 10 | 0.5 D | Present | Vesicle | Not Present | — | Not Present | Not Present | Good | Excellent |
| Ex. 14 | 5 | 5 | 3 | 10 | 10 | 0.5 D | Present | Vesicle | Not Present | — | Not Present | Not Present | Excellent | Excellent |
| Ex. 15 | 5 | 5 | 3 | 20 | 10 | 0.5 D | Present | Vesicle | Not Present | — | Not Present | Not Present | Excellent | Good |
| Ex. 16 | 5 | 5 | 0.1 | 4 | 10 | 0.5 D | Present | Vesicle | Not Present | — | Not Present | Not Present | Good | Good |
| Ex. 17 | 5 | 5 | 10 | 20 | 10 | 0.5 D | Present | Vesicle | Not Present | — | Not Present | Not Present | Good | Good |
| Ex. 18 | 5 | 5 | 3 | 7 | 1 | 5 D | Present | Vesicle | Not Present | — | Not Present | Not Present | Excellent | Good |
| Ex. 19 | 5 | 5 | 3 | 7 | 3 | 1.7 D | Present | Vesicle | Not Present | — | Not Present | Not Present | Excellent | Excellent |

TABLE 1-continued

| | Antiviral agent | | | | Surface protective layer | | | | Thermoplastic resin layer | | | Evaluation | |
|---|---|---|---|---|---|---|---|---|---|---|---|---|---|
| | Addition amount (pts·mass) | Average particle size (μm) | First peak in particle sizes (μm) | Second peak in particle sizes (μm) | Thickness (μm) | Average particle size of antiviral agents with respect to thickness D of surface protective layer | Nucleating agent | Condition of nucleating agent | Inorganic particles | Nucleating agent | Condition of nucleating agent | Inorganic particles | Antiviral properties | Scratch resistance |
| Ex. 20 | 5 | 5 | 3 | 7 | 15 | 0.3 D | Present | Vesicle | Not Present | Present | Not Present | Not Present | Excellent | Excellent |
| Ex. 21 | 5 | 5 | 3 | 7 | 25 | 0.2 D | Present | Vesicle | Not Present | Not Present | Not Present | Not Present | Good | Excellent |
| Ex. 22 | 5 | 5 | 3 | 7 | 10 | 0.5 D | Present | Untreated | Not Present | Not Present | — | Not Present | Excellent | Good |
| Ex. 23 | 5 | 5 | 3 | 7 | 10 | 0.5 D | Not Present | — | Present | Not Present | — | Not Present | Excellent | Excellent |
| Ex. 24 | 5 | 5 | 3 | 7 | 10 | 0.5 D | Not Present | — | Not Present | Present | Vesicle | Not Present | Excellent | Excellent |
| Ex. 25 | 5 | 5 | 3 | 7 | 10 | 0.5 D | Not Present | — | Not Present | Present | Untreated | Not Present | Excellent | Good |
| Ex. 26 | 5 | 5 | 3 | 7 | 10 | 0.5 D | Not Present | — | Not Present | Not Present | — | Present | Excellent | Excellent |
| Ex. 27 | 5 | 5 | 3 | 7 | 10 | 0.5 D | Present | Vesicle | Not Present | Present | Vesicle | Not Present | Excellent | Excellent |
| Comp Ex. 1 | — | — | — | — | 10 | — | Present | Vesicle | Not Present | Present | Vesicle | Not Present | Poor | Excellent |
| Comp Ex. 2 | 0.1 | 5 | 3 | 7 | 10 | 0.5 D | Present | Vesicle | Not Present | Not Present | — | Not Present | Poor | Excellent |
| Comp Ex. 3 | 5 | 5 | 3 | 7 | 10 | 0.5 D | Not Present | — | Not Present | Not Present | — | Not Present | Excellent | Poor |
| Comp Ex. 4 | 11 | 5 | 3 | 7 | 10 | 0.5 D | Present | Vesicle | Not Present | Not Present | — | Not Present | Excellent | Poor |

As shown in Table 1, from the evaluation results of Examples 1 to 27 and Comparative Examples 1 and 2, it was found that when the amount of antiviral agent added was 0.2 parts by mass or more as in Examples 1 to 27, the antiviral properties were higher than when the amount of antiviral agent added was less than 0.2 parts by mass as in Comparative Examples 1 and 2.

From the evaluation results of Examples 1 to 27 and Comparative Example 3, it was found that when the nucleating agent or inorganic particles are added to the surface protective layer or the thermoplastic resin layer as in Examples 1 to 27, the scratch resistance is higher than when the nucleating agent or inorganic particles are not added to the surface protective layer or the thermoplastic resin layer as in Comparative Example 3.

Further, the decorative sheet and the decorative member of the present disclosure is not limited to the aforementioned embodiments and examples, and various modifications may be made within a range not departing from the spirit of the present invention.

REFERENCE SIGNS LIST 10, 20, 30: Decorative sheet;
40: Decorative member;
11: Substrate sheet;
12: Colored pattern layer;
13: Adhesive layer;
14, 34: Surface protective layer;
25, 35: Thermoplastic resin layer;
46: Primer layer;
47: Substrate.

What is claimed is:

1. A decorative sheet, comprising:
a substrate sheet;
an adhesive layer;
a surface protective layer; and
a thermoplastic resin layer, wherein
at least one of the surface protective layer and the thermoplastic resin layer contains a nucleating agent or inorganic particles,
the surface protective layer has added thereto a silver-based antiviral agent at an amount of 0.2 parts by mass or more and 10 parts by mass or less;
the surface protective layer has a thickness of 3 μm or more and 15 μm or less,
the silver-based antiviral agent has an average particle size which is 1.5 μm or more and 10 μm or less; and
particle sizes of the silver-based antiviral agent have a first peak in a range of 1 μm or more and 5 μm or less, and a second peak in a range of 5 μm or more and 10 μm or less.

2. The decorative sheet of claim 1, wherein the antiviral agent is supported by an inorganic material.

3. The decorative sheet of claim 1, wherein the surface protective layer has a surfactant further added thereto.

4. The decorative sheet of claim 3, wherein the surfactant includes at least any one of a cationic surfactant, an amphoteric surfactant, and a nonionic surfactant.

5. A decorative member, comprising:
a substrate; and
the decorative sheet of claim 1, which is attached to the substrate.

6. The decorative sheet of claim 1, wherein the amount of the silver-based antiviral agent in the surface protective layer is 0.2 parts by mass or more and 5 parts by mass or less.

7. The decorative sheet of claim 1, wherein the silver-based antiviral agent has the average particle size which is 5 μm or more and 10 μm or less.

* * * * *